May 5, 1964     C. L. GRAYBILL     3,131,581
FULLY AUTOMATIC POWER TRANSMISSION AND VEHICLE CONTROL MEANS
Filed Sept. 6, 1960     2 Sheets-Sheet 1
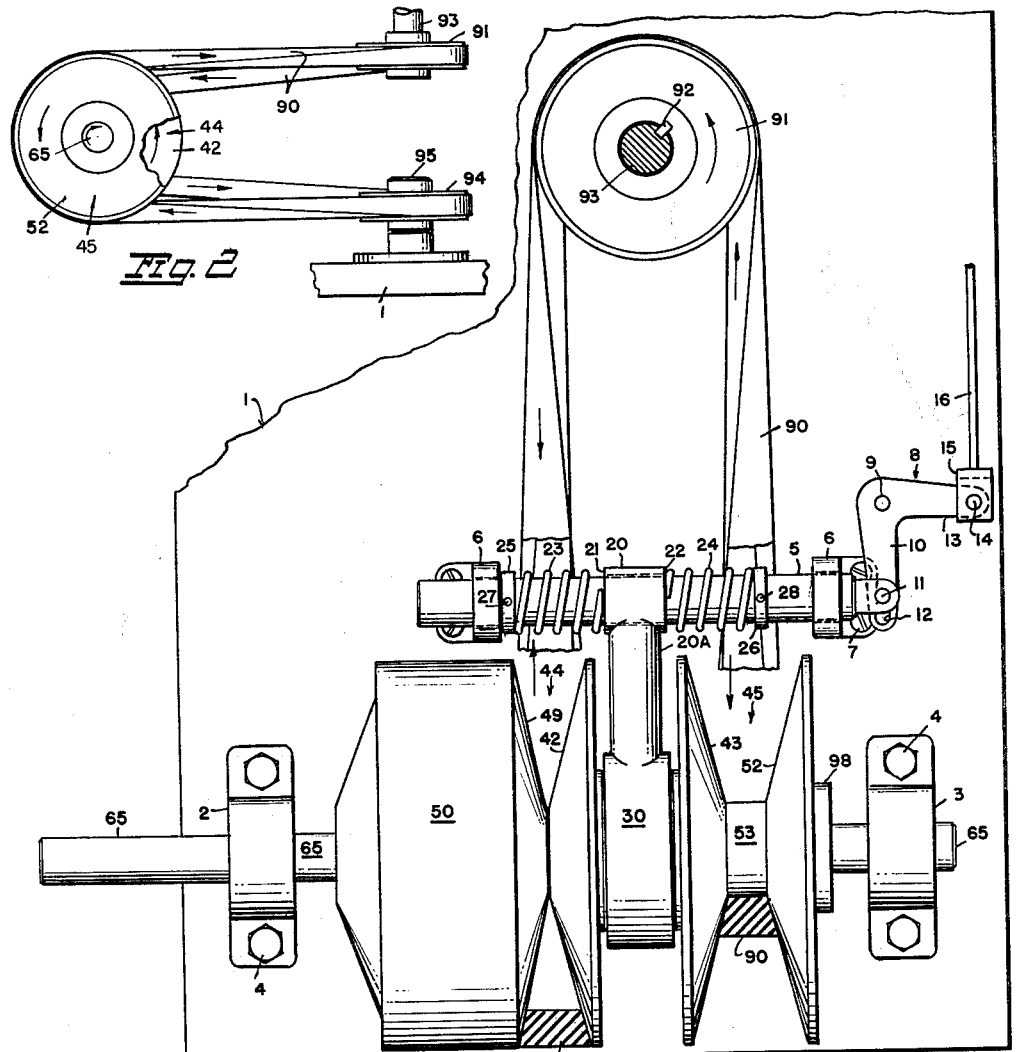
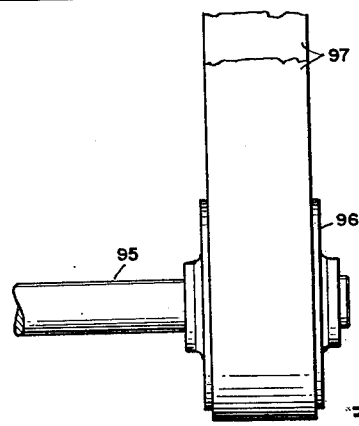
INVENTOR.
CLINTON L. GRAYBILL
BY James D. Girnan
ATT'Y

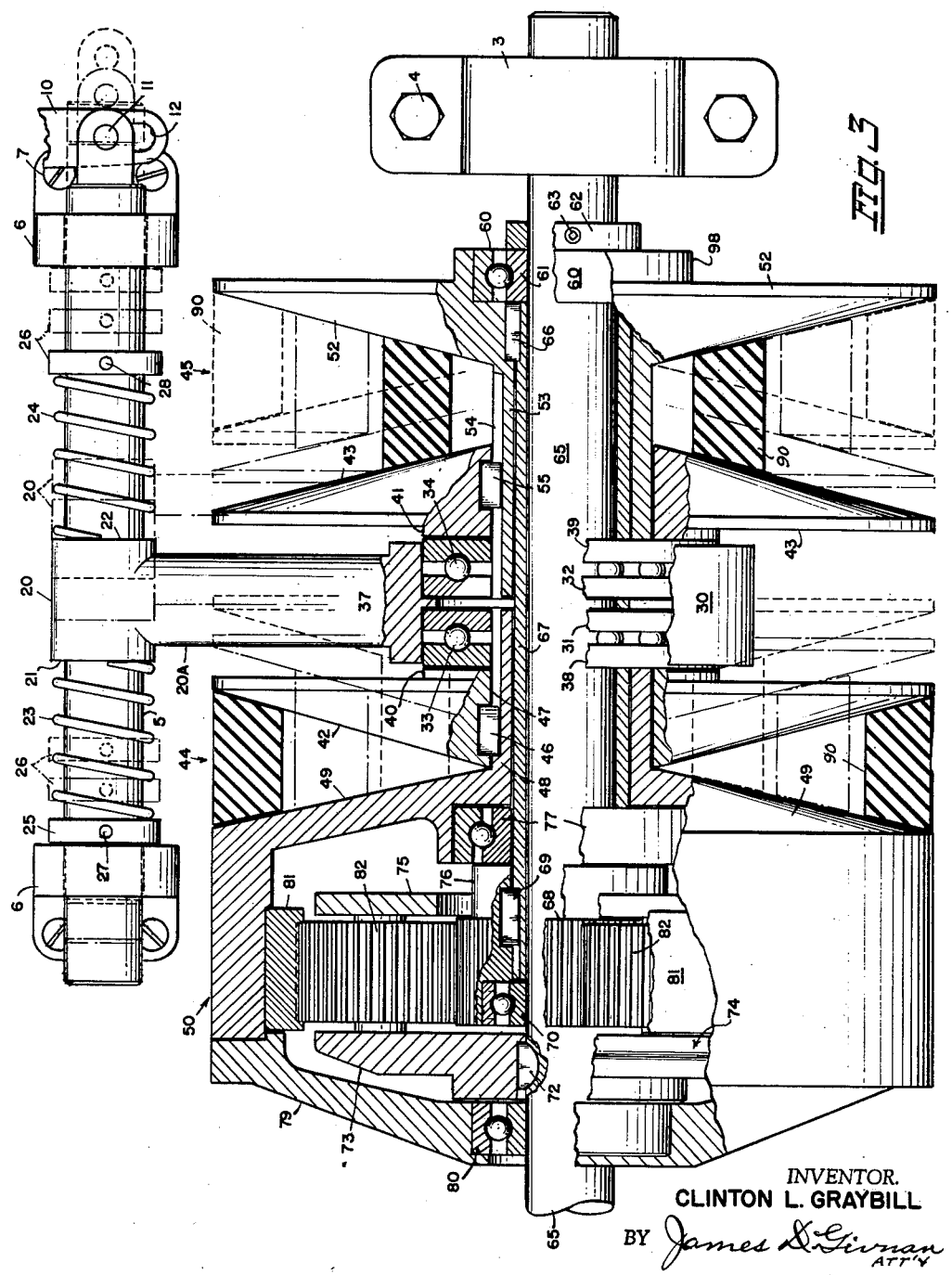

United States Patent Office 3,131,581
Patented May 5, 1964

3,131,581
FULLY AUTOMATIC POWER TRANSMISSION
AND VEHICLE CONTROL MEANS
Clinton L. Graybill, Superior, Mont., assignor to Graybill Industries, Inc., Superior, Mont., a corporation of Montana
Filed Sept. 6, 1960, Ser. No. 54,060
3 Claims. (Cl. 74—740)

This invention relates to automatic variable speed power transmission mechanisms and has for one of its principal objects to provide a transmission which is fully automatic in transmitting power from a drive shaft through two cooperative variable speed split pulleys and epicyclic gearing to a driven shaft under all load conditions in either direction and to automatically alter the speed of rotation of the driven shaft from zero to maximum in direct proportion to the load imposed upon the pulley by the driven shaft.

Another object is the provision of an automatic variable speed power transmission of the character described which utilizes a single belt entrained over the pulleys mentioned and wherein the effective diameters of the split pulleys will be self-equalizing without the use of springs or other instrumentalities heretofore necessary to effect movement of the split pulley members toward or away from each other.

The foregoing and other objects and advantages which will become subsequently apparent reside in the details of construction and operation as more fully hereinafter described and claimed, reference being had to the accompanying drawings forming a part hereof and in which:

FIGURE 1 is a top plan view of an automatic transmission constructed in accordance with my invention and with fragments of the driving belt broken away for convenience of illustration.

FIGURE 2 is a fragmentary side elevational view of FIGURE 1 on a reduced scale and with parts omitted.

FIGURE 3 is a view similar to FIGURE 1 on an enlarged scale with fragments broken away and parts in section for convenience of illustration.

FIGURE 4 is a fragmentary detail view of a modification illustrating the fact that the transmission may be driven by a horizontal shaft and a belt entrained over either a differential housing or the hub of the other outside pulley member.

With continuing reference to the drawings wherein like references of character designate like parts, reference numeral 1 indicates a platform, a car body or any other horizontal supporting surface upon which the transmission of this invention may be mounted by bearing blocks 2 and 3 secured as at 4 to the platform. A shifting rod 5 is slidably mounted in slide bearings 6 secured as at 7 to the platform 1. A bell-crank 8 is pivotally attached to the platform as at 9. The end of one arm 10 of the bell-crank is pivotally and slidably attached to one end of the shifting rod 5 by means of a pin 11 and a slot 12. The end of the other arm 13 of the bell-crank is pivotally attached as at 14 to a yoke 15 secured to one end of an actuating rod 16.

Slidably attached to the shifting rod 5 at the center thereof is a collar 20 integrated with one end of a shifting arm 20A. The collar 20 provides shoulders 21 and 22 for the inner ends of compression springs 23 and 24 whose outer ends normally abut collars 25 and 26 adjustably secured to the shifting rod 5 as at 27 and 28. The other end of the shifting arm 20A terminates in a ring member 30 within which the inner races 31 and 32 of ball bearings 33 and 34 are secured by a forced fit against an annulus 37 and the outer races 38 and 39 bear against and are rotatable with hub portions 40 and 41 of shiftable members 42 and 43 of split pulleys indicated generally at 44 and 45, respectively. The pulley member 42 is attached by a sliding key 46 and keyway 47 to the hollow hub portion 48 of the inner wall 49 of a circular housing indicated generally at 50. This wall 49 of the housing serves as a companion pulley member for the pulley member 42.

A companion pulley member for the member 43 of pulley 45 is indicated at 52 and is integrated with a hollow hub portion 53 provided with a keyway 54 to which is slidably attached by a sliding key 55 the pulley member 43. The pulley member 52 is provided with a ball bearing 60 whose inner race 61 bears against a retaining ring 62 secured as at 63 to a driven or power output shaft indicated at 65.

The pulley member 52 is permanently secured by a key 66 to one end of a hollow shaft 67 to whose outer end a sun gear 68 is secured by a key 69 and the sun gear is provided with a ball bearing 70 surrounding the shaft 65. Keyed to the shaft 65 by means of a key 72 is one side 73 of a planet carrier indicated generally at 74 whose opposite side is in the form of a ring member 75 surrounding the hub 76 of the sun gear 68 whose outer end bears against the inner race of a radial thrust bearing 77 carried within the hub portion of the wall 49 of the housing 50. The housing is closed by an end bell 79 having a bearing 80 surrounding the shaft 65 and the inner peripheral wall of the housing is provided with a ring gear 81.

Planet gears 82 are rotatably carried by the carrier members 73 and 75 and are enmeshed at all times with the ring gear 81 and therefore are capable of driving the housing 50 and hence the pulley member 49 in either a clockwise or counter clockwise direction of rotation depending upon the direction of rotation of the sun gear 68 with which the planet gears are always enmeshed.

As shown in FIGURES 1 and 2, an endless belt 90 is entrained over the pulleys 44 and 45 and over a driving V-pulley 91 secured as at 92 to the shaft 93 of an engine not shown and which may be mounted in any suitable manner upon the platform 1. The belt 90 is also entrained over an idling pulley 94 rotatable about a fixed axis provided by a vertical stub shaft 95 permanently secured to the platform 1.

From the foregoing it will be readily apparent that the pulley members 42 and 43 may be yieldingly independently moved toward their respective companion pulley members 49 and 52 by the shifting arm 20A to the ends of whose collar the springs 23 and 24 react by movement of the shifting rod 5 in either direction. Such movement will, of course, vary the effective diameter of pulleys 44 and 45 as indicated by full, broken, and dotted lines in FIGURE 3.

With the two runs of the belt 90 in the position shown in FIGURE 2 and as indicated by the arrows applied thereto and by those applied to FIGURE 1, the power output shaft 65 and pulley 45 are rotating in a clockwise direction as shown in FIGURE 2 and as viewed from the right of FIGURES 1 and 3. The pulley 45 is rotating at a greater speed than the pulley 44 (rotating in the opposite direction) due to the difference in effective diameters of pulleys 44 and 45 as shown by the full line belt positions in FIGURES 1 and 3. Accordingly, the sun gear 68 which is connected to pulley 45 by hollow shaft 67 is rotating in a clockwise direction at a greater speed than the ring gear 81 whose rotation is retarded because of the slower speed of rotation imparted to the housing 50 by the slower speed of rotation of pulley 44.

To put the power output shaft 65 in counter-clockwise rotation, it is merely necessary to exert a forward pull on the actuating rod 16, which, through the linkage of the bell-crank 8, will move the shifting rod 5 to the right as viewed in FIGURES 1 and 3 and hence through the medium of the spring 23 move the pulley member 43 toward its companion member 52 to cause the belt 90 to reach the maximum effective diameter of the pulley 45 as indicated by dotted lines in FIGURE 3, while that portion of the belt entrained over the pulley 44 will cause the pulley members 42 and 49 to separate and thereby cause the belt run to reach the minimum effective diameter of pulley 44 also as indicated by dotted lines in FIGURE 3. The resultant decrease in speed of rotation of pulley 45, and sun gear 68 and the resultant increase in speed of the ring gear 81, will, through the medium of the sun gear now in retarded rotation, cause the planet carrier 74 and the planet gears 82 to orbit about the sun gear and thereby cause the planet carrier to drive the power output shaft 65 in a counter-clockwise direction.

The automatic operation of the invention is as follows:

With the engine running at a constant speed and the vehicle at a standstill, with the springs 23 and 24 fully relaxed, the pull of the belt over the pulleys 44 and 45 will cause the movable pulley members 42 and 43 to automatically position themselves relative to their respective fixed members 49 and 52 as shown in broken lines in FIGURE 3 to put both pulleys 44 and 45 in rotation in what might be termed a zero position, at the same ratio as that of the differential gears. If the shifting rod 5 is moved to the extreme right, as shown in dotted lines in FIGURE 3, the spring 23 will compress and react against the collar 20 and shift the arm 20A sufficiently to move the pulley members 42—43 and belt runs from the zero position to the full line position to drive the vehicle in a forward direction at maximum speed. When the vehicle encounters an upgrade and the torque load on the power output shaft 65 is thereby increased, the spring 23 due to the additional load and pull on the belt will compress and allow the belt and pulley members 42—43 to shift down to a higher torque ratio. If the control rod is released under these or any other load conditions, the belt and the pulley members 42—43 will quickly adjust themselves to the zero position. Conversely, if the shifting rod 5 is moved to the extreme left, the same automatic function will take place through the medium of the spring 24 and drive the vehicle in a reverse direction. The pulleys and work load ratio can be readily controlled by the amount or distance the shifting rod is moved in either direction to drive the vehicle at any desired speeds or bring it to a stop. Thus, it will be seen that the pulleys 44 and 45 are caused to adjust to varying loads by the way the speed and torque of the output shaft 65 is divided up into driving components by the sun gear 68 and ring gear 81. The springs 23 and 24, through the medium of shifting arm 20A, yieldingly urge the movable pulley members 42 and 43 toward their respective relative fixed pulley members 49 and 52 and thus act as automatic belt tighteners, and also compensate for the temporary increase in effective diameter of one pulley relative to the other. It is to be noted that it is the pull of the belt that automatically varies the active pulley diameters under certain conditions other than those which compel or render desirable manual shifting by the control rod 16 and shifting rod 5.

If it should be desired to provide a positive non-yieldable connection between the shifting rod 5 and the shifting arm 20A it would be necessary to merely fully compress both springs 23 and 24 against their respective ends of the collar 20 by the adjustable collars 25 and 26 and then lock the collars to the shifting rod by their respective set screws.

While I have shown a particular form of embodiment of my invention, I am aware that many minor changes therein will readily suggest themselves to others skilled in the art without departing from the spirit and scope of the invention.

Having thus described my invention what I claim as new and desire to protect by Letters Patent is:

1. An automatic variable speed transmission comprising a driving shaft and a driven shaft,
   a driving pulley secured to said driving shaft,
   a pair of split pulleys of uniform outside diameter associated with said driven shaft,
   each of said split pulleys comprising a relatively fixed pulley member and a relatively movable pulley member whereby the effective diameters of both split pulleys are variable,
   a differential gear train including a planet carrier secured to and rotatable with said driven shaft,
   planet gears carried by said carrier and enmeshed with a ring gear carried by the relatively fixed pulley member of one of said split pulleys,
   a sun gear rotatable about said driven shaft and enmeshed at all times with said planet gears,
   means interconnecting said sun gear with the relatively fixed pulley member of the other of said split pulleys,
   an idling pulley having a permanently fixed axis of rotation,
   a single belt entrained over said idling pulley and over said driving pulley and operatively interconnecting said split pulleys for rotation in opposite directions,
   manual control means,
   means associated with said control means and attached to said movable pulley members for shifting the same relative to said fixed pulley members to vary the speed ratios of said split pulleys from zero to maximum and to minimum,
   resilient means interposed between said manual control means and the said means associated therewith whereby imposing variable torque loads upon said driven shaft in either direction or rotation said split pulleys will be caused to move into relative speed ratios by the pull of the belt independent of the said means associated with said manual control means.

2. An automatic variable speed transmission comprising a driving shaft and a driven shaft,
   a driving pulley secured to said driving shaft,
   a pair of split pulleys of uniform outside diameter associated with said driven shaft,
   each of said split pulleys comprising a relatively fixed pulley member and a relatively movable pulley member whereby the effective diameters of both pulleys are variable,
   a differential gear train including a planet carrier secured to and rotatable with said driven shaft,
   planet gears carried by said carrier and enmeshed with a ring gear carried by the relatively fixed pulley member of one of said split pulleys,
   a sun gear rotatable about said driven shaft and enmeshed at all times with said planet gears,
   means interconnecting said sun gear with the relatively fixed pulley member of the other of said split pulleys,
   an idling pulley having a permanently fixed axis of rotation,
   a single belt entrained over said idling pulley and over said driving pulley and operatively interconnecting said split pulleys for rotation in opposite directions,
   manually operable control means including a shifting rod,
   spaced apart bearing blocks slidably mounting said shifting rod,
   an arm slidably mounted at one of its ends on said shifting rod and engaged at its opposite end with said relatively movable pulley members for shifting the same as a unit relative to said fixed pulley members to vary the speed ratios of said split pulleys from zero to maximum and to minimum, and
   resilient means interposed between said arm and said bearing blocks whereby imposing torque loads upon said driven shaft in either direction of rotation said split pulleys will be caused to move into relative speed ratios by the pull of the belt independent of said manually operable control means.

3. An automatic variable speed transmission as claimed in claim 2 including,
abutment means carried by said shifting rod between said arm and said bearing blocks, and
means locking said abutment means in selected variable spaced relation to said arm to thereby vary the compression load of said resilient means against the arm whereby the arm can be caused to move as an integral part of said shifting rod or yielding independent thereof.

References Cited in the file of this patent
UNITED STATES PATENTS

| | | |
|---|---|---|
| 2,218,712 | Johnson | Oct. 22, 1940 |
| 2,684,598 | Backman | July 27, 1954 |
| 2,932,216 | Schou | Apr. 12, 1960 |